Nov. 17, 1970    R. S. SCHWARTZ    3,540,110
GUIDE DEVICE
Filed April 12, 1968

INVENTOR.
RICHARD S. SCHWARTZ
BY
ATTORNEY

United States Patent Office 3,540,110
Patented Nov. 17, 1970

3,540,110
GUIDE DEVICE
Richard Stephen Schwartz, Union Township, Union County, N.J., assignor to Thomas & Betts Corporation, Elizabeth, N.J., a corporation of New Jersey
Filed Apr. 12, 1968, Ser. No. 721,009
Int. Cl. B23p *13/00, 19/00;* H05k *13/00*
U.S. Cl. 29—200                                10 Claims

ABSTRACT OF THE DISCLOSURE

The invention is directed to a guide device composed of a base member and a plurality of guide members any of which may be selectively assembled to the base member to form the guide device. The base member is arranged, by means of mounting slots or by either use of an adhesive, to be firmly affixed to a mounting surface such as a harness board, a bulkhead, or wall, or similar surface. The guide member may then be selectively engaged with the base member and when its function has been completed may be removed from the base member. In a first use of the device as a moveable corner post for a wire harnessing apparatus the base member will be affixed to a harnessing board in accordance with the desired routing of the conductors which are to be made into the wire harness. The guide member is then selected in accordance with the guiding functions to be performed. For example, the guide member for a linear run of the wire harness may be a straight guide portion perpendicular to the surface of the harness board itself. But if it is desired to branch the harness to take individual conductors to different connectors, or locations, then the guide portion may be made in the shape of a C, or some other curved surface in order to provide a rounded corner about which the conductor may be directed. The base member is provided with a boss and a retainer and in addition with a locking means provided on a flexible arm. The guide member is provided with a recess and shoulders to fit upon the boss of the base member and prevent lateral movement of the guide member with respect to the base member. Additionally, a hook is provided on the guide member to engage with the retainer of the base member and prevent movement of the guide member, with respect to the base member, in a first direction. The stop, on the flexible arm of the base member, will engage with a corresponding groove on the guide member so as to lock the guide member against movement in a second direction opposite the first. The stop member on the base member may be disengaged by depressing the stop member and thus moving it by means of the flexible arm out of engagement with the guide member so that the guide member may then be removed from the base member. Additionally, if it is desired, the guide member may be provided with mounting slots for the receipt of fastening devices so that the guide member may be directly mounted upon a mounting surface without the requirement for the use of a base member. The base and guide members may be tethered to prevent loss of the guide member when removed from the base member.

BACKGROUND OF THE INVENTION

Field of the invention

The invention is directed to the field of providing guide posts for the formation of cable harness from individual conductors. The guide device also provides a stop, or index position, for the positioning of various jigs and fixtures during manufacturing or testing operations. Further, the guide device may be used as a means for supporting cables, conduit or the like, on a mounting surface such as a floor, wall or the like. Further, the guide device may also be used generally for the hanging, or support, of various objects and principally where it is desired that the guide device may be readily separated from the base member which may be permanently affixed to the mounting surface.

Description of the prior art

Prior art guide devices for use in cable harnessing generally take the form of common nails driven into a plywood board upon which has been sketched the desired run of the conductors which make up the cable harness. No guide device, of the type disclosed in this invention, is known in the prior art. The technique of using nails driven into a plywood base produces certain difficulties in that the nails themselves are generally ridged in some manner to provide greater ability to remain in the board, and this ridging provides rough edges which will generally abrade the insulation of conductors placed therein. In addition, the nails themselves, unless firmly anchored into the board, are easily removed therefrom and may be bent due to continual usage. Further, the nails generally will have a head which will offer some resistance to conductors being laid within the route of the cable harness and will provide some difficulty in removing the conductors, and the harness, once assembled. Additionally, the nails are generally found inadequate if the cable harness is large and requires a great number of conductors. Also, the nails provide a certain degree of hazard to the operator because of their general roughness and irregularity and the presence of the head. In a similar fashion, nails are often used to position jigs, fixtures or testing apparatus during the manufacture or testing operations for various mechanical and electrical components or assemblies.

SUMMARY OF THE INVENTION

The guide device of the present invention overcomes the above noted difficulties found in prior art techniques for the forming of wire harnesses. This is done by the simple expedient of using a guide device having both a base member and a guide member. The base member may be fastened by means of screws, through slots provided therefor or may be glued to the mounting surface by use of an adhesive material. Once the base member has been properly positioned the guide member may be detachable engaged with the base member to provide a guide post of the desired shape. It has been found in cable harnessing, for example, that the guide post is conveniently C-shaped having a rounded cross section. Such guide posts will provide a minimum of edges and thus prevent abrasion of the insulation of conductors being routed along the wire harness path. Additionally, the C-shape will provide for the capture of the individual conductors and retain them in a bundle above the harness board surface prior to their being tied. Once the bundling operation has been completed the guide portion may be detached from the base portion to permit the easy removal of the assembled cable bundle. In addition the guide device, as described herein, may be used as a stop or positioning guide for jigs, fixtures or the like to be used during manufacture or testing operations. Furthei the guide device, as described herein, may be used as a support means for conductors, for cable bundles, con duit, or the like. It is therefore an object of this inventiop to provide a guide device useful with wire harnessin techniques.

It is another object of this invention to provide a guide device composed of two portions, a base member and a guide member, which may be detachably coupled to one another.

It is another object of this invention to provide a guide means, having a base member to which a plurality of guide members may be detachably connected, in accordance with the particular needs for the guide device.

It is still another object of this invention to provide a guide device, having a detachable guide member which may be positioned during the cable bundling operation and may be removed from the base member upon completion of the cable bundling operation, to facilitate the removal of the completed cable bundle.

It is yet another object of this invention to provide an improved guide device, as well as a support, and fixed stop.

Other objects and features of the invention will be pointed out in the following description and claims and illustrated in the accompanying drawings, which disclose, by way of example, the principles of the invention, and the best modes which have been contemplated for carrying them out.

BRIEF DESCRIPTION OF THE DRAWING

In the drawing.

Similar elements are given similar reference characters in each of the respective figures.

DESCRIPTION OF THE PREFERRED EMBODIMENTS

Figure 1:
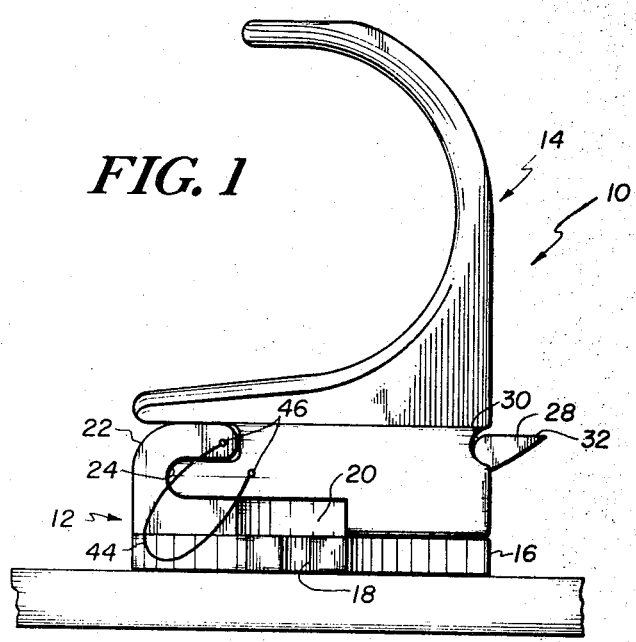
FIG. 1 is a side elevation of a guide device constructed in accordance with the concepts of the invention.
Figure 2:
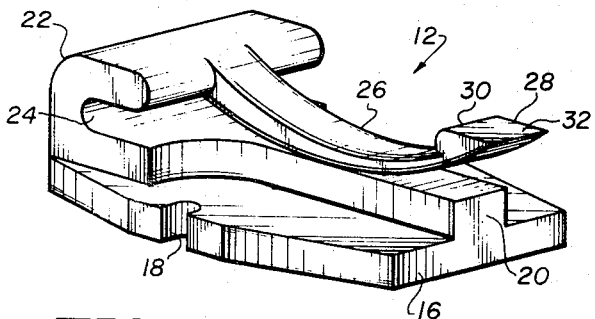
FIG. 2 is an isometric view of the base member of the guide device as shown in FIG. 1.
Figure 3:
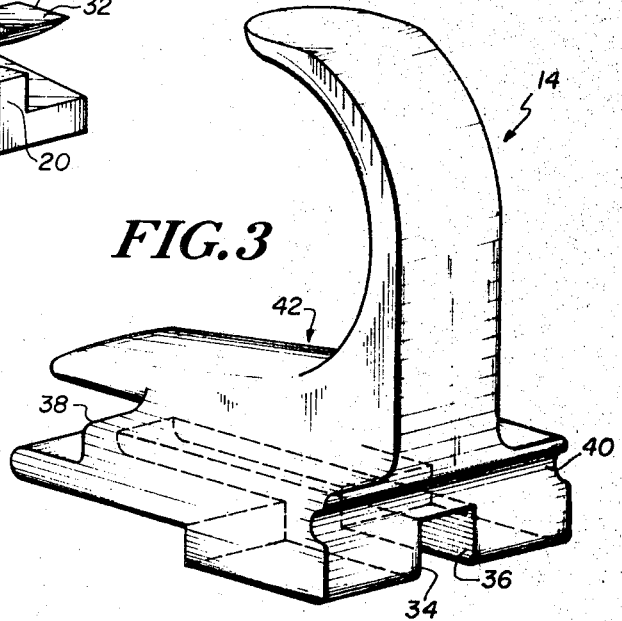
FIG. 3 is a perspective view of the guide member of the guide device as shown in FIG. 1.

Turning now to FIGS. 1, 2 and 3 there is shown a guide device 10 constructed in accordance with the concepts of the invention. Guide device 10 consists of a base member 12 and a guide member 14. As may be better seen in FIG. 2, the base member 12 has a base portion 16 in which may be provided mounting slots 18. Fastening devices, such as screws, bolts, welding studs, or the like (not shown) may be fastened through the mounting slots 18 in order to secure the base member 12 to a mounting surface (not shown). Alternatively, the base member 12 may be coated on its underside with an adhesive to permit the cementing of the base member 12 to a mounting surface. Running along the length of the base member 12 is a boss 20 which terminates in a retainer 22 in the shape of a hook. Retainer 22 provides a longitudinal groove 24, which, as will be described below, is used to engage a complementary knob on the guide member 14. Formed integrally with retainer 22 is a flexible arm 26 which terminates in a retaining stop 28. Retaining stop 28 has a lock tab 30 and a finger flat 32.

Guide member 14 (see FIG. 3) is provided with a complementary slot 34 which permits the positioning of the guide member 14 over the boss 20 of the base member 12. An additional slot 36 is provided for the receipt of the flexible arm 26 therein to permit its movement and thus, as will be described below, the release of the guide member 14 once it has been positioned with respect to the base member 12. A knob 38 acts as a stop and will engage the longitudinal groove 24 of retainer 22 of the base member 12. Engagement of the knob 38 with the groove 24 of the retainer 22 will prevent movement of the guide member 14 in a forward direction, that is in a direction bringing the knob 38 into contact with the retainer 22 once seating of the knob 38 in the groove 24 has been accomplished. A transverse groove 40 is provided at the rear edge of the guide means 14 for receipt therein of the lock tab 30 of the retaining stop 28. The upper portion of the guide member 14 is provided with a C-shaped guide post 42 for receipt therein of individual conductors being formed in a wire harness. The engagement of the lock tab 30 with the groove 40 will prevent the movement of the guide member 14 in a backward direction, that is towards the right of FIG. 1.

In order to assemble the guide member 14 to the base member 12 the knob 38, of the guide member 14, is positioned within the groove 24, of the retainer 22 and the guide member 14 is then pushed downwardly causing the lock tab 30, on the retaining stop 28, to slide along the back surface of the guide member 14 until tab 30 engages the groove 40 locking the guide member 14 to the base member 12. At this point relative movement between the guide member 14 and the base member 12 is prevented. Movement of the guide member 14 is not permitted in the forward direction, that is toward the left of FIG. 1, due to the engagement of knob 38 with the groove 24. In a similar fashion movement in the backward direction, or towards the right of FIG. 1, is prevented by the engagement of the lock tab 30 with the groove 40. Movement in the lateral direction is prevented by the shoulders abutting the slot 34 and their engagement with the boss 20 of the base member 12.

With this arrangement it is seen that the individual conductors forming the cable bundle could be routed about a smooth surfaced guide post and in addition the individual conductors, forming the cable bundle, will be held in a position above the surface of the mounting board. This will permit the easy installation of cable bundling straps, or the like, when desired to tie the individual conductors into a bundle. In addition, when the bundle is to be removed, to prevent interference between the guide device and the cable bundle, the guide member 14 may be removed simply by depressing the finger flat 32 which will remove the stop tab 30 from the groove 40 and permit the guide member 14 to be disengaged from the base member 12. If desired, in order that guide member 14 not be misplaced once it has been removed from the base member 12, a restraining cord such as 44 may be fastened by means of fasteners such as 46 to the base member 12 and the guide member 14. Different sizes of guide member 14 may be employed with the same base member to facilitate the routing and bundling of the different size conductor bundles. Additionally, the shape of the guide member 14 may be changed depending upon the use of the guide device. For example, if it is desired that this be a fixed stop for a jig, fixture, or testing device, a guide member 14, in the shape of a vertical post, may be employed. Additionally, this guide device 10 can be employed for the supporting of conductors, conduit or the like on a wall member. In such a situation the guide device 12 would then be mounted in a horizontal fashion, or vertical fashion, as desired and the conductors, or conduit, then run within the third region 42.

Figure 4:
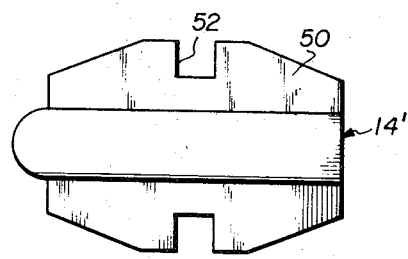
FIG. 4 is a top plan view of an alternative construction of the guide member as illustrated in FIG. 3.

Turning now to FIG. 4 an alternative arrangement of the guide device of FIG. 1 is shown. In this arrangement the detachable base member 12 has been eliminated and flanges 50, having mounting slots 52 therein, have been provided. In this manner, the guide member 14' may be directly fastened to the mounting surface or permanently affixed thereto.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

1. A guide comprising: a base member comprising: a retainer coupled to said base member; a resilient arm coupled at one end thereof to said base member; stop means coupled to the other end of said resilient arm to engage a post means to prevent movement of said post means with respect to said base member in a first direction; post means for selective assembly with said base member; said post means comprising: a post body; a stop rib on to said post body for engagement with said retainer of said base member to prevent movement of said post body with respect to said base member in a second direction opposite said first direction; and guide means coupled to said post means.

2. A guide as defined in claim 1, wherein said base member further comprises mounting slots for the receipt therein of fastening devices whereby said base member may be fastened to a mounting surface.

3. A guide as defined in claim 1, wherein said base member further comprises a boss on said base member and said post means further comprises a complementary slot arranged to engage said boss when said post means and base member are assembled whereby relative movement between said post means and said base member in third and fourth directions transverse to said first and second directions is prevented.

4. A guide as defined in claim 1, wherein said post means further comprises a stop slot for receipt therein of said stop means of said base member in locking engagement.

5. A guide sa defined in claim 1, further comprising coupling means coupled to said base member and said post means whereby said post means may be disengaged from said base member but may not be moved further than a predetermined distance therefrom.

6. A guide as defined in claim 1, wherein said guide means is curved.

7. A guide as defined in claim 1, wherein said guide means is C-shaped.

8. A guide as defined in claim 1, wherein said guide means is C-shaped and the cross section of said guide means is rounded.

9. A guide as defined in claim 3, wherein said post means further comprises an additional slot for the receipt therein of said resilient arm.

10. A guide as defined in claim 1, wherein said post means further comprises mounting slots for the receipt therein of fastening devices for the fastening of said post means to a mounting surface independent of said base member.

References Cited

UNITED STATES PATENTS

| | | | |
|---|---|---|---|
| 2,264,408 | 12/1941 | Rohr et al. | 29—203 |
| 3,345,728 | 10/1967 | Upchurch | 29—203 |

THOMAS H. EAGER, Primary Examiner

U.S. Cl. X.R.

29—150, 203

UNITED STATES PATENT OFFICE
CERTIFICATE OF CORRECTION

Patent No. 3,540,110  Dated November 17, 1970

Inventor(s) Richard Stephen Schwartz

It is certified that error appears in the above-identified patent and that said Letters Patent are hereby corrected as shown below:

Column 1, line 67, "harness" should be -- harnesses --.

Column 3, line 73, "recepit" should be -- receipt --.

Column 5, line 2, delete "to".

Column 5, line 22, "sa" should be -- as --.

SIGNED AND
SEALED

FEB. 2, 1971

(SEAL)
Attest:

Edward M. Fletcher, Jr.
Attesting Officer

WILLIAM E. SCHUYLER, JR.
Commissioner of Patents